Nov. 23, 1965    M. J. FLYNN    3,218,887
ECHO-RANGING DEVICES
Filed Nov. 13, 1962    2 Sheets-Sheet 1
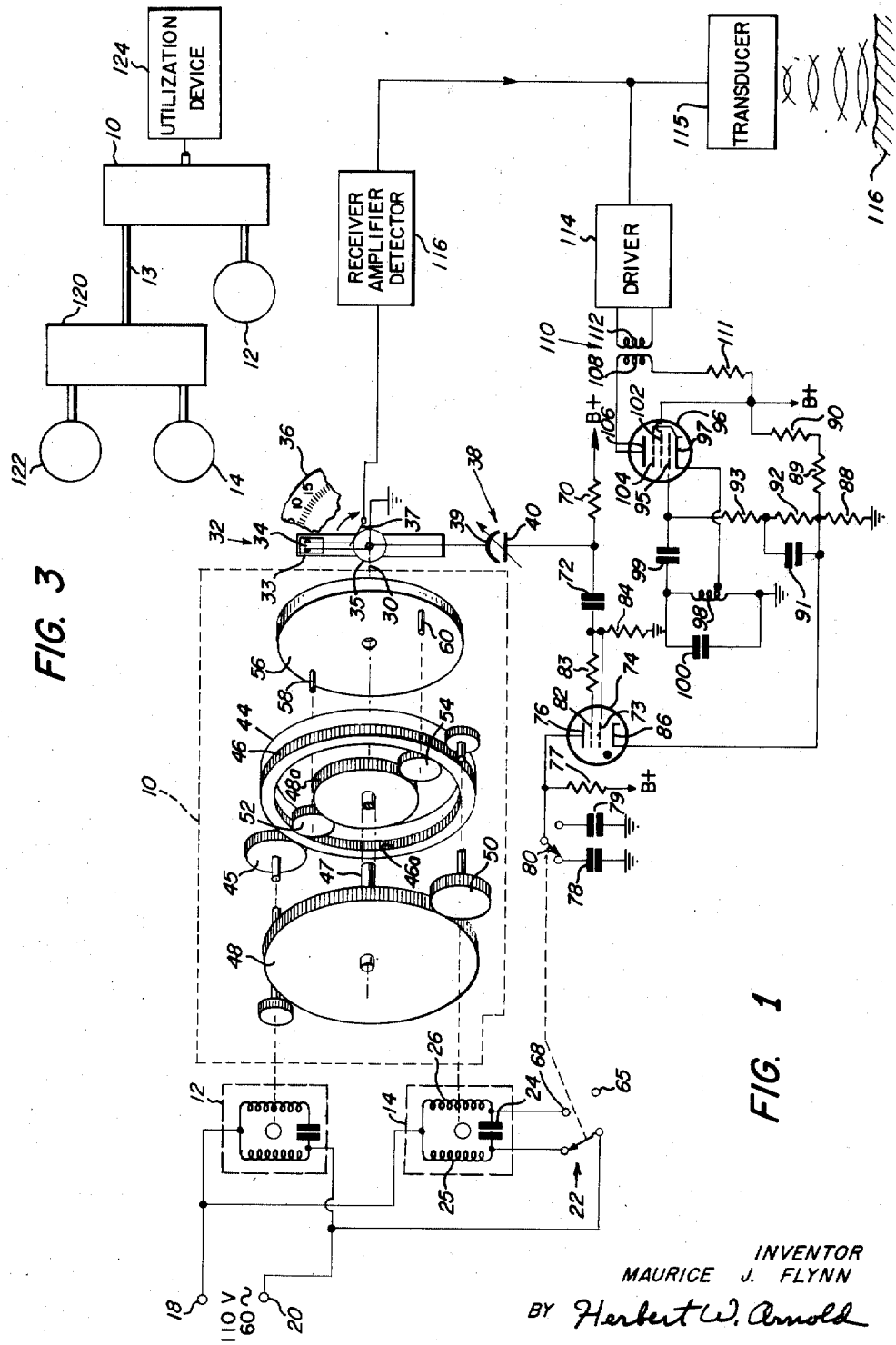
INVENTOR
MAURICE J. FLYNN
BY Herbert W. Arnold
ATTORNEY

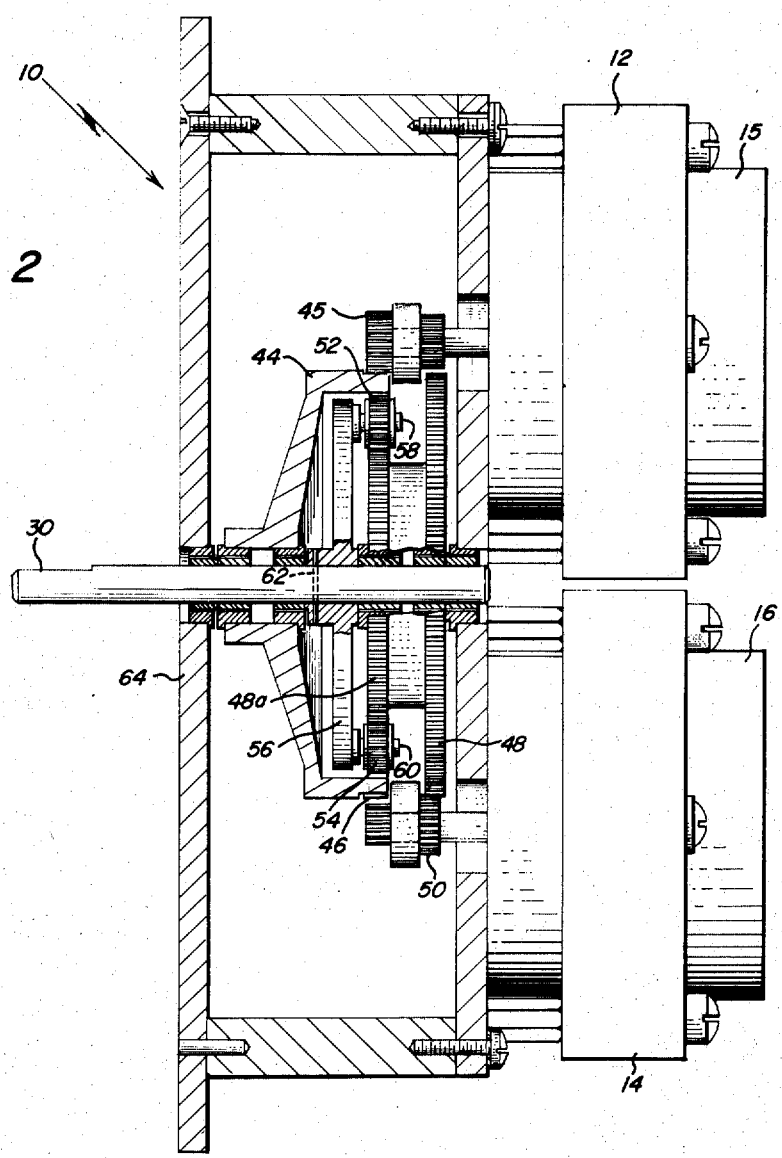

3,218,887
ECHO-RANGING DEVICES
Maurice J. Flynn, San Francisco, Calif., assignor to Raytheon Company, Lexington, Mass., a corporation of Delaware
Filed Nov. 13, 1962, Ser. No. 236,971
3 Claims. (Cl. 74—675)

This invention relates to distance-measuring devices of the pulse-echo type and, more particularly, to a multiple speed drive for the driving of indicator arms or stylus arms as used in depth sounders.

In sonic depth-sounding equipment, which is to be used for inland waterways where the range required is relatively short and for deep sea navigation where the required range is relatively long, it is frequently desirable to provide a depth-sounding indicator capable of recording in both feet and fathoms. It is required to drive the stylus arm of the depth sounder at two speeds in order to accomplish the recording of both feet and fathoms at the ratio of 6 to 1. In the past, depth sounders which record in both feet and fathoms have used two separate motors intercoupled to a common output shaft by overriding clutches, one motor driving at six times the speed of the other motor.

Other depth sounders utilize positive latch ratchet clutches, so geared that the driving pawl is selected and operated indirectly by reversing a single motor. While such devices provide the six-to-one output ratio required, a chief disadvantage to these drives is the mechanical bumping or bouncing which occurs at the time of making a speed shift. For example, as the pawl in a particular drive mechanism engages the ratchet to drive the output shaft at either a lower or higher speed, there is a tendency for the output shaft to become overdriven in speed and to bounce and oscillate against the pawl mechanism. A further disadvantage of the overriding clutch and ratchet-type drive is that the output shaft is "freewheeling" in nature so that it is free to revolve at a speed in excess of the driven speed. It is necessary to introduce friction to restrict the speed of the output shaft to the driven speed. Due to the relatively low torque requirements of this type of drive mechanism, the introduction of friction to stabilize such oscillation is not desirable, inasmuch as it dictates the need for more powerful and expensive motors.

The present invention discloses a driving mechanism for an indicator system having two motors, both of which are at all times fully engaged to the output shaft by direct gear connections. The driving synchronous motors operate, therefore, as accelerators and decelerators to provide a unique buffering action which provides a constant output shaft speed in direct relationship to the synchronous driving frequency. This is achieved by providing a drive mechanism which provides a first output speed by adding through suitable gear ratios the input speeds from two synchronous motors and provides a second output speed by reversing the direction of one of the input speeds, thereby to substract one of the input speeds from the other. In particular, in one embodiment of the invention there is provided a planetary or epicyclic gear train in which an output shaft is connected to a yoke. Integral with the yoke are studs which support planet gears which are free to rotate on said studs while in engagement with both sun cluster and ring gears. The first motor drives the ring gear at a constant forward speed and the second motor drives the sun cluster gear in the same forward direction. The output shaft, which is connected to the yoke which carries the planetary gears, revolves at an angular speed equal to the sum of the input speeds. To produce a lower output speed of the shaft, the second motor is reversed so that it drives the sun cluster gear in the opposite direction to the ring gear. Thus, to obtain a depth reading in either feet or fathoms, the two-speed drive mechanism is, for example, geared to turn the output shaft clockwise at substantially forty revolutions per minute for a reading in fathoms.

The invention further discloses the provision of additional speeds by providing a complete driving mechanism in place of either or both motors in the above-described arrangement. For example, the first motor is replaced by a separate planetary drive mechanism incorporating two motors at the input to provide a selection of multiple speeds which are dependent on the mode of operation of all three motors in this arrangement.

Other and further objects and advantages of this invention will become apparent as the description thereof progresses, reference being had to the accompanying drawings wherein:

FIG. 1 is a schematic diagram of a system embodying the invention;

FIG. 2 is a cross-section in elevation of the drive mechanism of said invention; and FIG. 3 is a schematic diagram of another system embodying this invention.

Referring to FIG. 1, there is shown a diagram of a depth sounder system utilizing the drive mechanism structure shown in FIG. 2. More particularly, a differential drive mechanism 10 is shown driven by two motors 12 and 14 rigidly mounted on brackets 15 and 16, respectively. Each of the motors are normally synchronous-type motors connected, as shown in FIG. 1, to a source of 117-volt sixty-cycle alternating current at terminals 18 and 20. Motor 14 is reversed in the usual manner by a reversing switch 22 which reverses the position of capacitor 24 with respect to field windings 25 and 26. Reversing the motor 14 determines whether a speed of the output shaft 30 of gear mechanism 10 provides a speed of forty revolutions per minute for fathom operation, or 240 revolutions per minute for measurement of depth in feet. The output shaft 30 is shown connected to drive a rotatable arm 33, which, as shown in FIG. 1, is pivoted substantially transversely about its midpoint on shaft 30. Fastened to one end of arm 33 is a neon indicator lamp 34, which is positioned adjacent to a calibrated circular dial 36. The indication of depth is provided by means of the flashing of the neon lamp. The rotation of the lamp is synchronized with the rest of the system so that the lamp flashes at zero on the scale whenever the system transmits sound energy. The returned echo is amplified and detected by the receiver circuitry and causes the neon lamp to flash again. However, the arm 33 will have rotated to a new position around the depth scale so that this second flash will provide an indication of water depth. This action takes place during each transmit-and-receive cycle of the system. Due to persistence of vision, these flashes will appear as continuous indications at zero and at the point on the scale which corresponds to the depth of the reflecting object or to the bottom.

Attached to the other end of arm 33 are the rotor plates of a variable capacitor 38. This capacitor, in a manner which will be subsequently described in detail, provides a keying pulse, which occurs substantially at the time the neon lamp 34 passes the zero mark at the top of the scale. Capacitor 38 is provided with movable plates 39 which are grounded through the arm 33 and fixed plates 40 which are insulatedly connected to the input of the pulse-producing circuit. It may be noted, that, since the condenser plates 39 are at the opposite end of the arm 33 from the lamp 34, a balanced structure may be obtained which may be rotated at high speeds without any substantial variations.

In order to supply an indicating signal to lamp 34, the outer end thereof, which constitutes one terminal of the lamp, is connected through a metallic clamp or mounting bracket to arm 33 and then to ground through the motor 14. The other end of the lamp 34 is attached to a metallic clamp, not shown, insulatedly mounted on arm 33 and connected to a slip ring 35 insulatedly mounted on shaft 30 behind arm 33. A metallic brush 37 engages slip ring 35 and is insulatedly mounted on a support plate, not shown. Application of the desired signal to the brush 37 connects the signal across the lamp 31, thereby producing illumination thereof.

Referring now to the multiple speed synchronous drive mechanism 10 of FIGS. 1 and 2, a synchronous motor 12 drives a ring gear 44 at a constant forward speed at, for example, 1800 revolutions per minute by means of motor pinion gear 45. FIG. 2 provides a diagrammatic display of the drive system, direction of rotation being viewed from the motor end. The external teeth in ring gear 44 are shown at 46 and the internal teeth at surface 46a of FIG. 1. Synchronous motor 14 drives a sun cluster gear 48 by means of motor pinion 50. Sun cluster gear 48 is shown diagrammatically in FIG. 1 as being directly connected by a shaft 47 to be integral with internal sun gear surface 48a. Sun gear 48, as shown in FIG. 2, is provided with an inner surface 48a, integral therewith, which supports planetary gears 52 and 54 which are connected to an output yoke 56 by means of studs 58 and 60, respectively. These gears are free to rotate on said studs while in engagement with both sun gear 48a and the internal surface of ring gear 44. Planetary gears 52 and 54 are connected to output yoke 56, which, in turn, is connected to output shaft 30 by means of a pin 62. Accordingly, the output shaft turns at the differential speed of motors 12 and 14. Shaft 30, as shown in FIG. 2, is mounted on a motor housing 64 which is rigidly secured to the housing of motors 12 and 14 and rotates freely in bearings, as shown. For example, assuming motor 14 to be stopped by turning switch 22 to terminal 65, the pinion 45 and ring gear 44 contain a number of teeth, which, in this embodiment, results in the output shaft turning one hundred r.p.m. counterclockwise or clockwise. Assuming, however, motor 12 is stopped and motor 14 turns, for example, at 1800 r.p.m. counterclockwise, output shaft 30 is driven 140 r.p.m. clockwise. However, if both motors are running, as is the case in the present embodiment, the output shaft 30 rotates at a speed equal to the sum of the influence of each motor. Therefore, with motor 14 running counterclockwise and motor 12 running clockwise, the resultant output shaft speed is equal to 140 minus one hundred which equals forty revolutions per minute. This, as noted, is the speed at which indicator 32 is driven to provide depth-indication readings in fathoms. However, by reversing motor 14 by turning switch 22 to terminal 68, the resulting counterclockwise running of motor 12 results in a shaft output speed of 140 plus one hundred, which equals 240 revolutions per minute. These are the normal settings for securing two output speeds with a high-speed-versus-low-speed operating ratio of 6 to 1. By using motor 14 as the constant direction drive and motor 12 as the reversing drive, an additional group of two output speeds is provided.

In the particular embodiment described herein, both motors are rotating at substantially 1800 revolutions per minute. The relative teeth of the various gears to provide two output speeds at a ratio of 6 to 1, that is, feet or fathoms, in one embodiment can be twenty-four teeth for the driving or pinion gears, twenty-three teeth in the planetary gears connected to the yoke, one hundred eighty teeth on sun gear 48, one hundred fifteen teeth on sun gear 48a, and one hundred sixty-one teeth and one hundred eighty teeth on the interal and external sides, respectively, of the ring gear. In general, the internal side of the ring gear has approximately seven-fifths the teeth of the internal sun gear 48a. With this arrangement, a smooth transition from feet to fathoms, or the reverse, is achieved by reversing motor 14 with respect to motor 12.

Referring now to FIG. 1, there is shown a diagram of a depth sounder system utilizing the dual-speed mechanism of the invention. The movable plate 39 of the condenser 38 is connected to ground through the arm 33. The stationary plate 40 of the condenser 38 is connected to a B+ through a resistor 70 and through a capacitor 72 to grid 73 of a thyratron 74 whose anode 76 is connected to B+ through a quenching resistor 77 and to ground through charge damping capacitors 78 and 79, determined by the position of selector switch 80 shown ganged to selector switch 22. Screen grid 82 of thyratron 74 is connected to the grid 73 through a current-limiting resistor 83, and the grid 73 is, in turn, connected to ground through a grid-load resistor 84. Cathode 86 of thyratron 74 is connected to ground through a cathode load resistor 88, and to B+ through bleeder bias resistors 89 and 90 in series. Cathode 86 is also connected through a condenser 91 in parallel with a resistor 92 in series with a resistor 93 to the grid 95 of the self-quenching oscillator tube 96. Cathode 97 of tube 96 is connected to a tap on an inductor 98, one end of which is grounded and the other end of which is connected through a condenser 99 to grid 95. Inductor 98 is resonated at the desired oscillation frequency of the tube 96 by a condenser 100 in parallel with inductor 98. Screen grid 102 of tube 96 is connected to B+. Suppressor 104 of tube 96 is connected to the cathode 97 and the plate 106 is connected through the primary winding 108 of the transformer 110 and a resistor 111 in series to B+.

The secondary winding 112 of transformer 110 feeds a driver 114, which may be, for example, a pair of power amplifier tubes feeding in push-pull. The output of driver 114 is fed to a transducer 115 which may be, for example, of the magnetostrictive or crystal type and preferably is made substantially resonant at the oscillation frequency of the tube 96. The transducer 115 projects sound waves downwardly toward the bottom 116 of the water body, whose depth is to be measured and the return echo signals are picked up by the transducer and fed through a receiver-amplifier detector 116 to the brush 37 feeding the neon lamp 34. In operation, the meshing of plates 39 of the capacitor 38 with the plates 40 causes the capacity thereof to increase. As a result, the condenser 38 charges through resistor 70, causing a negative voltage to be applied to grid 73 of tube 74 as condenser 38 is increasing in capacity. However, as soon as the plates have become completely engaged and start to disengage, the capacity of condenser 38 decreases, causing a positive voltage to be applied to grid 73 of thyratron 74 through condenser 72, thereby firing the thyratron. The thyratron 74 is subsequently extinguished, due to the fact that condensers 78 or 79 in the plate circuit thereof discharges rapidly to a potential below the sustaining potential of the thyratron, and the resistor 77 is sufficiently large to prevent a discharge sustaining current to be drawn therethrough. By suitable adjustment of the size of the condenser 78 or condenser 79, determined by the selection switch 80, the duration of the firing of the thyratron 74 may be made on the order of a millisecond or less. For example, a pulse width of approximately .25 millisecond is provided by selector switch 80 connecting capacitor 78 in the circuit. This selector switch 80 is ganged to selector switch 22 to provide this pulse width when motors 12 and 14 are being driven in the same direction to measure deepth in feet. However, when the drive motor 14 is reversed by selector switch 22, capacitor 79 is connected in the thyratron damping circuit by switch 80 to provide a pulse width of approximately three milliseconds, corresponding to a depth measurement in fathoms. Firing of thyratron 74 causes a positive pulse to be applied to grid 95 of oscillator tube 96, thereby causing oscillator tube 96 to burst into oscillations. These oscillations rapidly build up in amplitude until grid current is drawn, charging condenser 99 to a point where grid 95 is biased sufficiently far below cut-off of the tube 96 to extinguish the oscillator. The condenser 99 discharges through the resistors 92 and 93 and the resistor 88 to a point where the oscillations may again occur by the tube 96. The size of resistor 92 and condenser 99 are adjusted such that the free-running quench rate, that is, the rate at which bursts of oscillation would be produced by oscillator 96 is somewhat less than the repetition rate of the pulse output of thyratron 74. As the result, the bursts of oscillations produced by the oscillator 96 synchronized with the triggering of thyratron 74, and, therefore, the bursts of oscillations may be fed to the transducer 115 substantially at the time the indicator lamp 34 passes the zero position on the square. The regenerative feedback of oscillator 96 is sufficiently great to allow the oscillator to block after a few hundred cycles or less of oscillations have occurred such that if the oscillator is operating in a supersonic range, as is usually the case, the length of the burst of oscillations is on the order of a few milliseconds. This initial burst of oscillations appears on the lamp 34 and gives an indication which may be used for zero adjustment of the position of the stationary plates 40 of the condenser 38.

Referring now to FIG. 3, there is shown an arrangement for use with more than two motors to provide a plurality of output speeds, all of which will be synchronized to the frequency of the alternating currents actuating the drive system. For example, the differential drive mechanism 10 may be driven by motor 12, and shaft 13, which is normally connected to motor 14, is now connected to a second differential drive mechanism 120 which, in turn, is driven by motor 14 and 122. The output of drive mechanism 10 drives a shaft which may be connected to a utilization device 124. With this arrangement, three separate ranges of feet-to-fathom indications are possible. For example, range one is in the order of zero to two hundred feet, range two, zero to two hundred fathoms, and range three, zero to two thousand fathoms. Range two and range three differ by a ratio of ten to one, that is, two thousand to two hundred, which condition can be achieved by using the input differential drive system 120, having a gear ratio increment of ten, with two separate motors driving this sector of the mechanism. This input mechanism is then coupled to the basic six to one differential drive 10 in place of motor 14 in the basic unit. This provides three motors, two of which drive the ten-to-one input device, and the third motor coupled with the output of the ten-to-one unit jointly drives the basic six-to-one ratio output mechanism. This arrangement, as noted, does not use clutches of any type, and thus avoids the inherent mechanical problems of friction and overrunning clutches which have caused maintenance problems in the past.

A further application of the invention provides that one of the two input motors 12 or 14 be energized from a fixed frequency power source and the second motor from a varying frequency which is the resolution of a Doppler effect resultant from the speed of the vessel on which said device may be carried. The output shaft of the device is then used to vary the speed of a chart-fed utilization device in accordance with the speed of the vessel. At the same time, the motor which operates from the fixed frequency power source is geared to provide a six-to-one speed ratio change to complement equal space of the markings on the chart or utilization device for a change in the range from feet to fathoms. A further application of the dual speed mechanism is to provide that one motor be driven from a fixed frequency source with the other motor from a variable frequency source which is controlled by water temperature. Since the speed of sound varies with water temperature, the output speed of the drive mechanism then varies as a direct function of the speed of sound and thus a recorder or depth indicator can be automatically compensated to provide a higher accuracy read-out. The second motor is then available for executing the six-to-one shift in speed for both foot and fathom ranges.

This completes the description of the particular embodiments of the invention illustrated herein. However, many modifications thereof will be apparent to persons skilled in the art without departing from the spirit and scope of this invention. For example, other types of oscillator-driven circuits could be used and other types of indicators besides the neon lamp 34, such as permanent record indicators, wherein marks are made on the sensitive paper indicative of echo signals, could also be used with the drive mechanism arrangement illustrated herein. Accordingly, it is desired that this invention not be limited by the particular details of the species illustrated herein except as defined in the appended claims.

What is claimed is:

1. A variable speed drive mechanism comprising:
   a ring gear;
   a first sun gear located external to said ring gear;
   a second sun gear located within said ring gear;
   an output shaft attached to said first and second sun gears;
   a first gear means coupled to the outer rim of said ring gear external to said output shaft for selectively rotating said ring gear at a first speed in a first direction;
   a second gear means coupled to the outer rim of said first sun gear external to said output shaft for selectively rotating said first sun gear at a second speed in said first direction;
   means for changing the direction of rotation of at least one of said gears; and,
   a planetary gear attached to said output shaft and coupled to said ring and second sun gears, said planetary gear causing said output shaft to rotate at a third speed in said first direction when said first gear means is rotating said ring gear and said second gear means is not rotating said first sun gear, at a fourth speed in said first direction when said first gear means is not rotating said ring gear and said second gear means is rotating said first sun gear, and at a speed proportional to the algebraic sum of said third and fourth speeds when said first gear means is rotating said ring gear and said second gear means is rotating said first sun gear.

2. A variable speed drive mechanism comprising:
   a ring gear;
   a first sun gear located external to said ring gear;
   a second sun gear located within said ring gear;
   an output shaft attached to said first and second sun gears;
   a first means coupled to the outer rim of said ring gear external to said output shaft for selectively rotating said ring gear at a first speed in a first direction including a first pinion gear, a first motor, and a first shaft attached to said first pinion gear and said first motor;
   a second means coupled to the outer rim of said first sun gear external to said output shaft for selectively rotating said first sun gear at a second speed in said first direction including a second pinion gear, a second motor, and a second shaft attached to said second pinion gear and said second motor;
   means for changing the direction of rotation of at least one of said gears; and,
   a planetary gear attached to said output shaft and coupled to said ring and second sun gears, said planetary gear causing said output shaft to rotate at a third speed in said first direction when said first means is rotating said ring gear and said second means is not rotating said first sun gear, at a fourth speed in said first direction when said first means is not rotating said ring gear and said second means is rotating said first sun gear, and at a speed proportional to the algebraic sum of said third and fourth speeds when said first means is rotating said ring gear and said second means is rotating said first sun gear.

3. A variable speed drive mechanism comprising:

a first ring gear;
a first sun gear located external to said first ring gear;
a second sun gear located within said first ring gear;
a first shaft attached to said first and second sun gears;
a first means coupled to the outer rim of said first ring gear external to said first shaft for selectively rotating said first ring gear at a first speed in a first direction including a first pinion gear, a first motor, and a second shaft attached to said first pinion gear and said first motor;
a second means coupled to the outer rim of said first sun gear external to said shaft for selectively rotating said first sun gear at a second speed in said first direction including a second pinion gear, a second motor, and a third shaft attached to said second pinion gear and said second motor;
a first planetary gear attached to said first shaft and coupled to said first ring and second sun gears for causing said first shaft to rotate in response to the selective rotation of said first ring and first sun gears;
a second ring gear attached to said first shaft;
a third sun gear located external to said second ring gear;
a fourth sun gear located within said second ring gear;
a fourth shaft attached to said third and fourth sun gears;
a third means coupled to the outer rim of said third sun gear external to said fourth shaft for selectively rotating said third sun gear at a third speed in said first direction including a third pinion gear, a third motor, and a fifth shaft attached to said third pinion gear and said third motor;
means for changing the direction of rotation of at least one of said gears; and,
a second planetary gear attached to said fourth shaft and coupled to said second ring and fourth sun gears for causing said fourth shaft to rotate in response to the selective rotation of said first ring gear, said first sun gear, said second ring gear, and said third sun gear.

References Cited by the Examiner

UNITED STATES PATENTS

| | | | |
|---|---|---|---|
| 2,009,449 | 7/1935 | Hedley | 116—129 |
| 2,015,702 | 10/1935 | Williams | 340—3 |
| 2,054,109 | 9/1936 | Williams | 116—129 |
| 2,198,171 | 4/1940 | MacKenzie | 340—3 |
| 2,284,654 | 6/1942 | Harrison | 340—3 |
| 2,417,198 | 3/1947 | Hindmarch | 74—675 |
| 2,436,582 | 2/1948 | Lear | 74—675 X |
| 2,578,015 | 12/1951 | Reinhard | 74—675 X |
| 2,730,913 | 1/1956 | Friedman | 74—675 |
| 2,750,574 | 6/1956 | Fryklund | 340—3 |
| 2,762,040 | 9/1956 | Fryklund | 340—3 X |
| 2,781,616 | 2/1957 | Estabrook | 74—675 |
| 2,969,696 | 1/1961 | Fraga | 74—675 X |
| 2,972,905 | 2/1961 | Bullard | 74—681 |
| 3,076,173 | 1/1963 | Richter | 340—3 |
| 3,161,083 | 12/1964 | Roe | 74—675 |

CHESTER L. JUSTUS, *Primary Examiner.*

UNITED STATES PATENT OFFICE
CERTIFICATE OF CORRECTION

Patent No. 3,218,887                      November 23, 1965

Maurice J. Flynn

It is hereby certified that error appears in the above numbered patent requiring correction and that the said Letters Patent should read as corrected below.

Column 7, line 15, after "said" insert -- first --.

Signed and sealed this 10th day of January 1967.

(SEAL)
Attest:

ERNEST W. SWIDER                      EDWARD J. BRENNER
Attesting Officer                      Commissioner of Patents